United States Patent
Oka et al.

(10) Patent No.: US 10,529,482 B2
(45) Date of Patent: Jan. 7, 2020

(54) WIRE HARNESS AND ELECTROMAGNETIC WAVE SUPPRESSION MEMBER

(71) Applicant: Hitachi Metals, Ltd., Tokyo (JP)

(72) Inventors: Taichi Oka, Tokyo (JP); Takahiro Futatsumori, Tokyo (JP)

(73) Assignee: HITACHI METALS, LTD., Tokyo (JP)

(*) Notice: Subject to any disclaimer, the term of this patent is extended or adjusted under 35 U.S.C. 154(b) by 0 days.

(21) Appl. No.: 15/753,561

(22) PCT Filed: Oct. 19, 2015

(86) PCT No.: PCT/JP2015/079464
§ 371 (c)(1),
(2) Date: Feb. 20, 2018

(87) PCT Pub. No.: WO2017/068630
PCT Pub. Date: Apr. 27, 2017

(65) Prior Publication Data
US 2018/0247758 A1 Aug. 30, 2018

(51) Int. Cl.
*B60R 16/02* (2006.01)
*H01B 7/00* (2006.01)
(Continued)

(52) U.S. Cl.
CPC .......... *H01F 27/36* (2013.01); *H01B 7/0045* (2013.01); *H01F 27/24* (2013.01); *B60R 16/0215* (2013.01); *H01R 11/12* (2013.01)

(58) Field of Classification Search
USPC ............................................... 174/72 A, 350
See application file for complete search history.

(56) References Cited

U.S. PATENT DOCUMENTS 6,023,023 A * 2/2000 Takeuchi ............. H03H 1/0007
174/92
2009/0065100 A1* 3/2009 Yoshizawa .......... B22D 11/0611
148/305
(Continued)

FOREIGN PATENT DOCUMENTS

CN 200947370 Y 9/2007
CN 101351571 A 6/2011
(Continued)

OTHER PUBLICATIONS

International Preliminary Report on Patentability dated May 3, 2018 issued in PCT/JP2015/079464.
(Continued)

*Primary Examiner* — Timothy J Thompson
*Assistant Examiner* — Guillermo J Egoavil
(74) *Attorney, Agent, or Firm* — Scully, Scott, Murphy & Presser, P.C.

(57) ABSTRACT

A wire harness includes electric wires, and an electromagnetic wave suppression member provided at a periphery of the electric wires. The electromagnetic wave suppression member includes a restriction member and an annular magnetic core. The restriction member is provided so as to cover an outer periphery of the electric wires and includes an inner wall section that is harder than the electric wires. The magnetic core includes a nanocrystalline soft magnetic material and is provided at a periphery of the inner wall section.

6 Claims, 8 Drawing Sheets

(51) Int. Cl.
H01F 27/24 (2006.01)
H01F 27/36 (2006.01)
H01R 11/12 (2006.01)
H02G 3/04 (2006.01)
H05K 9/00 (2006.01)

(56) References Cited

U.S. PATENT DOCUMENTS

| | | | | |
|---|---|---|---|---|
| 2014/0174784 A1* | 6/2014 | Ichikawa | ............ | B60R 16/0207 |
| | | | | 174/68.3 |
| 2014/0182921 A1* | 7/2014 | Imahori | ................. | H01F 17/06 |
| | | | | 174/350 |
| 2015/0289423 A1* | 10/2015 | Imahori | ................. | H01F 17/06 |
| | | | | 307/10.1 |

FOREIGN PATENT DOCUMENTS

| | | |
|---|---|---|
| CN | 104979721 A | 10/2015 |
| JP | H05-102691 A | 4/1993 |
| JP | H08-45362 A | 2/1996 |
| JP | 2010-21571 A | 1/2010 |
| JP | 2014-130708 A | 7/2014 |

OTHER PUBLICATIONS

International Search Report dated Jan. 19, 2016 issued in PCT/JP2015/079464.
Official Action dated Jan. 28, 2019 received from the Chinese Patent Office in related Chinese Patent Application 2015800829614 together with English language translation.

* cited by examiner

WIRE HARNESS AND ELECTROMAGNETIC WAVE SUPPRESSION MEMBER

TECHNICAL FIELD

The present invention relates to a wire harness and an electromagnetic wave suppression member.

BACKGROUND ART

A wire harness is known which is installed in, e.g., a vehicle having an electric motor as a drive source to connect an inverter to the electric motor. It is known that some of such type of wire harness is provided with a braided shield to reduce electromagnetic noise emitted from electric wires of the wire harness.

JP 2014/130708 A discloses a wire harness which is provided with a magnetic core such as ferrite core in addition to the braided shield so as to further reduce electromagnetic noise emitted from the wire harness by the magnetic core.

CITATION LIST

Patent Literature

JP 2014/130708 A

SUMMARY OF INVENTION

Technical Problem

The ferrite core used as a magnetic core in JP 2014/130708 A, however, is large in size and also has a large mass. Thus, the wire harness using a ferrite core as a magnetic core has a problem that the degrees of freedom of routing layout are reduced due to a large size of the ferrite core and the handling properties of the wire harness decrease due to an increase in a mass.

Therefore, it is an object of the invention to provide a wire harness capable of suppressing an increase in its mass and improving the degrees of freedom of routing layout while reducing electromagnetic noise, and an electromagnetic wave suppression member.

Solution to Problem

To solve the above-mentioned problems, the invention provides a wire harness, comprising: electric wires; and an electromagnetic wave suppression member provided at a periphery of the electric wires, wherein the electromagnetic wave suppression member comprises a restriction member and an annular magnetic core, wherein the electromagnetic wave suppression member is provided so as to cover an outer periphery of the electric wires and comprises an inner wall section that is formed of a harder material than the electric wires, and wherein the magnetic core comprises a nanocrystalline soft magnetic material and is provided at a periphery of the inner wall section.

To solve the above-mentioned problems, the invention also provides an electromagnetic wave suppression member for being provided at a periphery of electric wires, comprising: a restriction member that is provided so as to cover an outer periphery of the electric wires and comprises an inner wall section that is harder than the electric wires; and an annular magnetic core that comprises a nanocrystalline soft magnetic material and is provided at a periphery of the inner wall section.

Advantageous Effects of Invention

According to the invention, it is possible to provide a wire harness capable of suppressing an increase in its mass and improving the degrees of freedom of routing layout while reducing electromagnetic noise, and an electromagnetic wave suppression member.

DESCRIPTION OF EMBODIMENTS

Embodiment

An embodiment of the invention will be described below in conjunction with the appended drawings.

Description of General Structure of Wire Harness

Figure 1A:
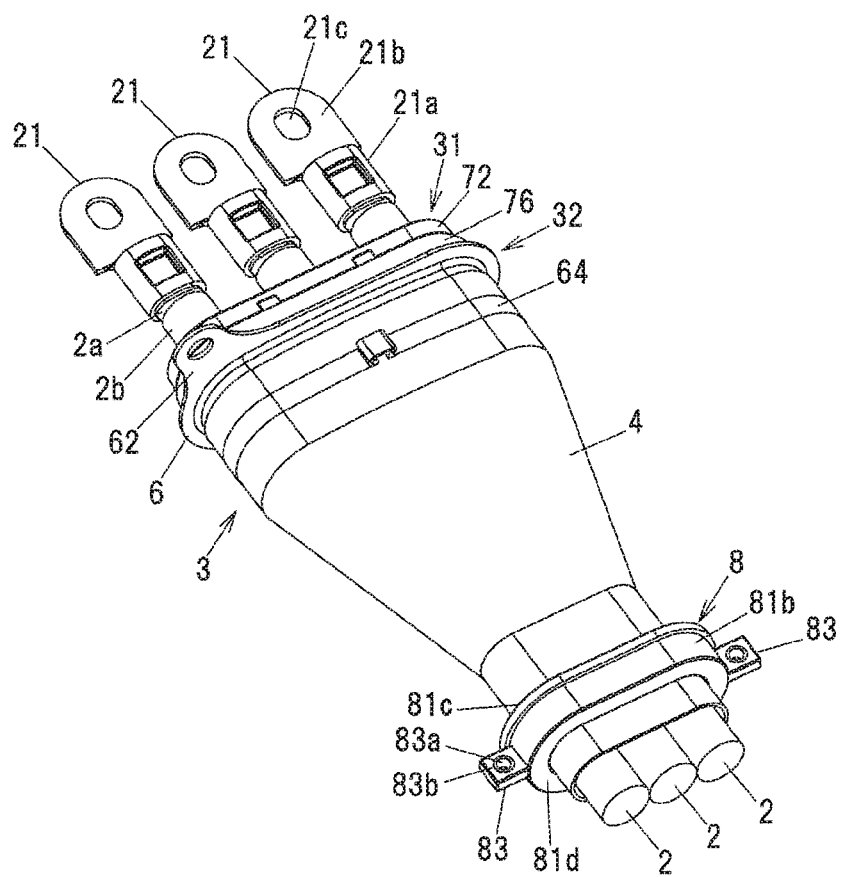
FIG. 1A is a perspective view showing an outer appearance of a wire harness in an embodiment of the present invention.
Figure 1B:
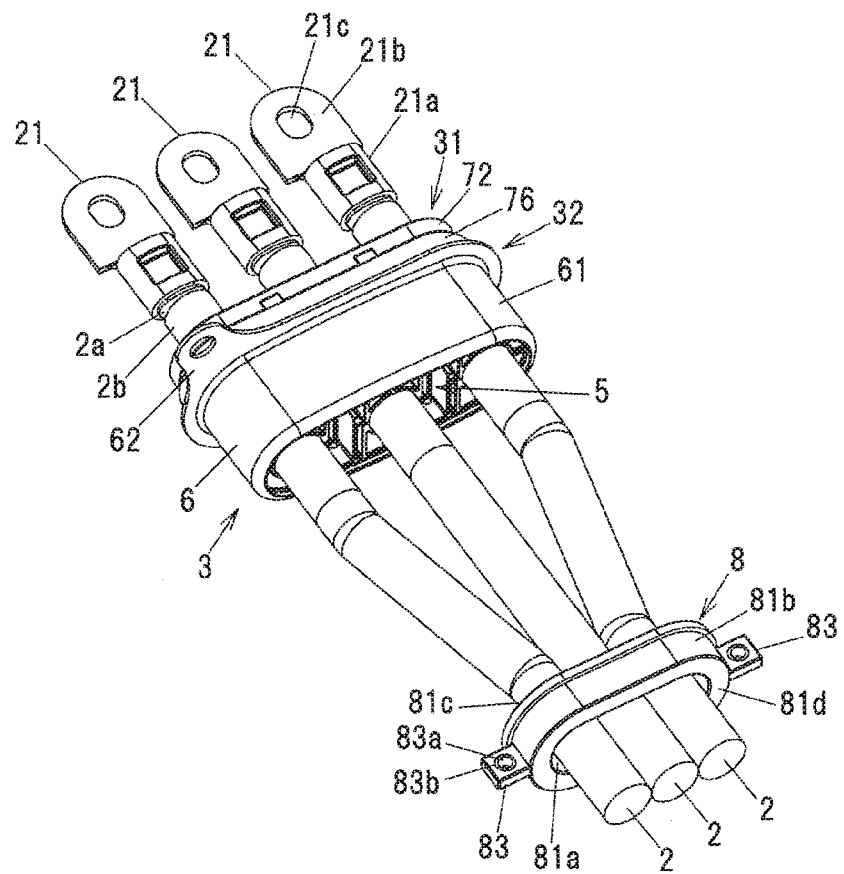
FIG. 1B is the perspective view of FIG. 1A with a braided shield omitted.

FIG. 1A is a perspective view showing an outer appearance of a wire harness in the present embodiment and FIG. 1B is the perspective view with a braided shield omitted. As shown in FIGS. 1A and 1B, a wire harness 1 is provided with electric wires 2 and a connector 3 attached at an end of the electric wires 2.

The wire harness 1 is installed in, e.g., a vehicle such as electric car or hybrid car using an electric motor as a drive source, and is used so that an electric current output from an inverter under PMW (Pulse Width Modulation) control is supplied to the electric motor. The electric current contains harmonic components produced by switching a switching element such as power transistor.

In the present embodiment, the wire harness 1 is configured to supply three-phase alternating current of U-phase, V-phase and W-phase through three electric wires 2 to the electric motor.

Each electric wire 2 is provided with a conductor 2a formed by twisting plural electrically high-conductive strands and an insulation 2b formed of an insulating resin and provided around the conductor 2a.

A connecting terminal 21 is connected to an end of each electric wire 2. The connecting terminal 21 integrally has a crimping portion 21a to be fixed to an end of the conductor 2a by crimping, and a plate-shaped connecting portion 21b extending from the crimping portion 21a. A connecting hole 21c for bolt fixation is formed on the connecting portion 21b so as to penetrate the connecting portion 21b in a thickness direction. The connecting portion 21b is bolt-fixed to a corresponding device-side connecting terminal provided on a terminal block in a mounting member (e.g., an inverter) as a connection destination, and the connecting terminal 21 is thereby electrically connected to the device-side connecting terminal.

A braided shield 4 is provided around the three electric wires 2 so that all the three electric wires 2 are covered therein. The braided shield 4 is formed by braiding plural shield wires of, e.g., tin-plated copper. In this example, six shield wires are bundled into one strand and such strands are braided by crossing in an X-shaped manner, thereby forming the braided shield 4. The inner diameter of the braided shield 4 can be enlarged or shrunk by, e.g., manually changing a size of mesh.

In the present embodiment, an electromagnetic wave suppression member 8 is provided around the braided shield 4. The details of the electromagnetic wave suppression member 8 will be described later.

A corrugated tube for protecting the electric wires 2 may be provided around the braided shield 4 (at a portion on which the electromagnetic wave suppression member 8 is not provided) even though it is not illustrated. The corrugated tube is a tubular member formed of resin and has an accordion tube shape in which large diameter portions and small diameter portions are alternately formed.

Description of the Connector 3

Figure 2:
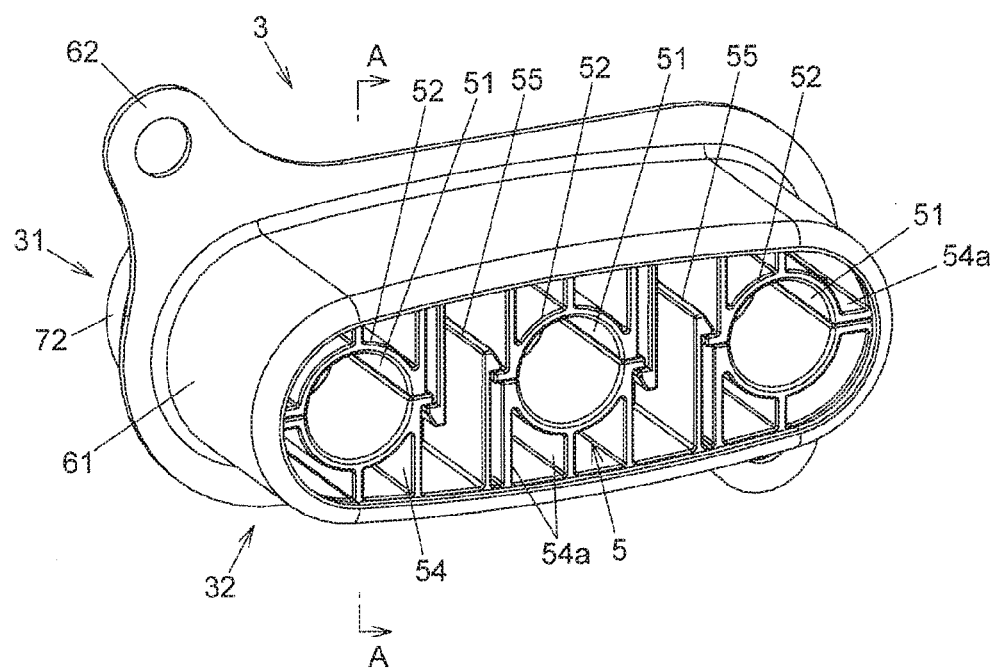
FIG. 2 is a perspective view showing a connector.
Figure 3:
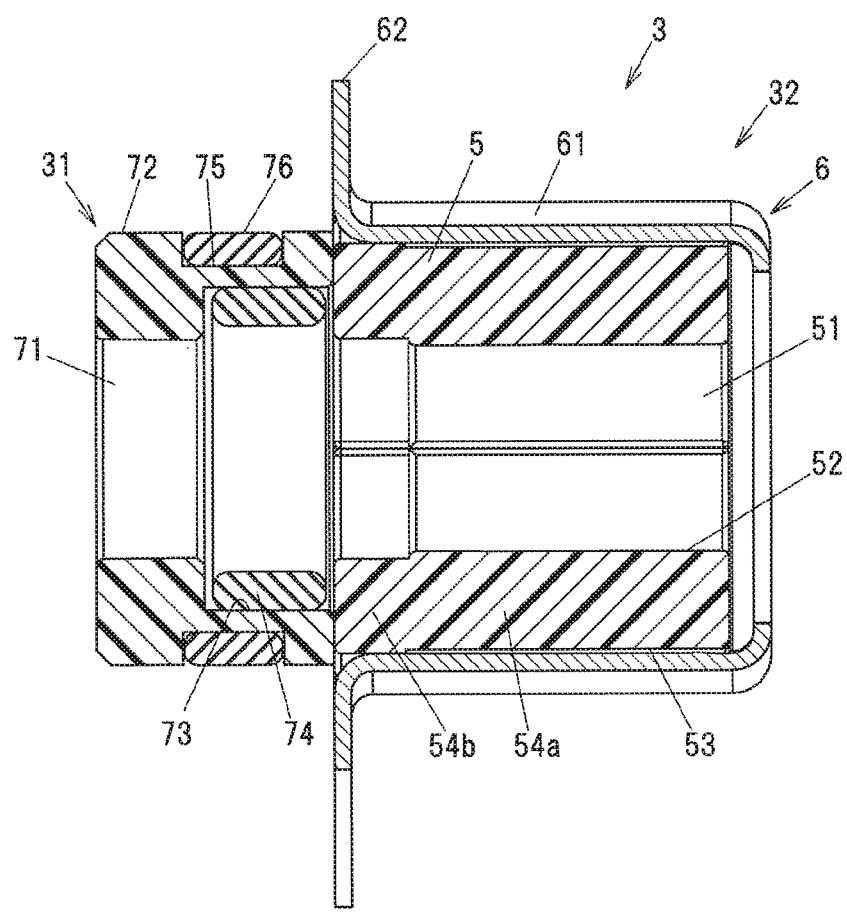
FIG. 3 is a cross sectional view taken along a line A-A in FIG. 2.

FIG. 2 is a perspective view showing the connector 3 and FIG. 3 is a cross sectional view taken along the line A-A in FIG. 2.

As shown in FIGS. 2 and 3, the connector 3 is provided with a housed member 31 to be housed in an attachment hole (not shown) formed on the mounting member (e.g., an inverter), and a wire holding member 32 arranged next to the housed member 31 along the electric wires 2.

The wire holding member 32 holds and fixes the electric wires 2 to the mounting member (e.g., an inverter). The wire holding member 32 is provided with a housing (wire holder) 5 formed of an insulating resin and a shield shell (shield case) 6 formed of a conductive metal.

Figure 4:
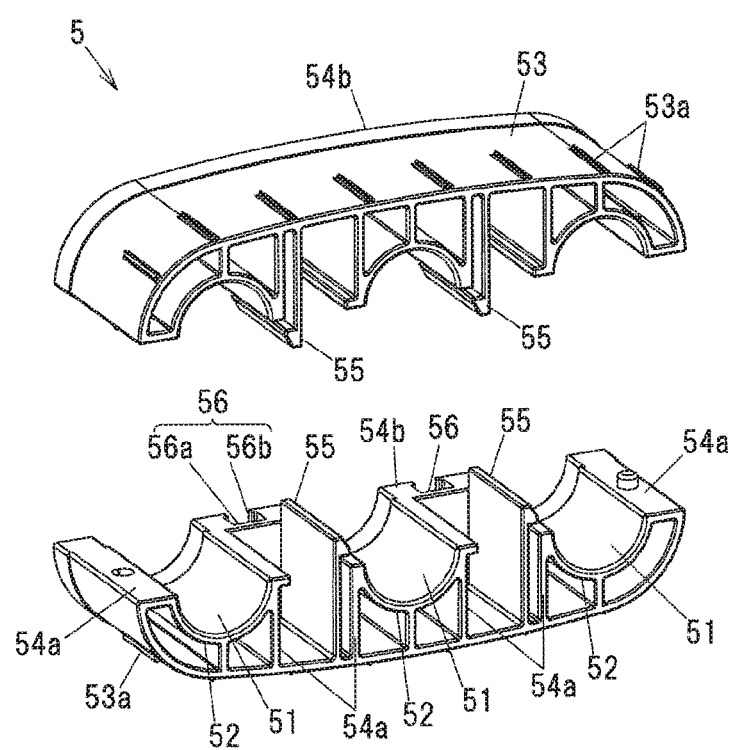
FIG. 4 is an exploded perspective view showing a housing.

As shown in FIGS. 2 to 4, the housing 5 integrally has wire support portions 52 for supporting the electric wires 2, an outer wall portion 53 covering the wire support portions 52, and a coupling portion 54 coupling the wire support portions 52 to the outer wall portion 53. The housing 5 is formed by, e.g., injection molding of, e.g., an insulating resin such as PBT (polybutylene terephthalate), PA (polyamide) or PPS (polyphenylene sulfide).

The wire support portion 52 has a cylindrical shape with an insertion hole 51 for insertion of the electric wire 2, and is configured to grip and hold the electric wire 2 inserted through the insertion hole 51. In this example, three wire support portions 52 are provided so as to correspond to the three electric wires 2. However, the configuration is not limited thereto. For example, the wire support portion may be one piece with three insertion holes 51. The three wire support portions 52 are aligned in a line at equal intervals in a direction perpendicular to the longitudinal direction of the electric wire 2 and are configured to hold the three aligned electric wires 2. In the following description of the connector 3, the longitudinal direction of the electric wire 2 is referred to as a length direction, the alignment direction of the electric wires 2 is referred to as a width direction, and a direction perpendicular to the length and width directions is referred to as a height direction.

The outer wall portion 53 has a cylindrical shape, and covers all the wire support portions 52 at a distance from each wire support portion 52. The coupling portion 54 has rib-shaped coupling pieces 54a respectively coupling center portions in the width direction and both side portions of the wire support portions 52 to the outer wall portion 53, and a front wall portion 54b provided on the front side of the electric wire 2 to cover a gap between the wire support portions 52 and the outer wall section 53.

The housing 5 in the present embodiment is split at the center in the height direction into upper and lower portions and the two halves of the housing 5 are fixed and integrated by a fixing means including lances 55.

The shield shell 6 is press-fitted onto the outer wall portion 53. The shield shell 6 is formed of, e.g., iron, brass or a conductive metal such as aluminum, and is configured to house at least a portion of the housing 5. Plural rib-shaped protrusions 53a extending along the length direction and arranged at intervals in a circumferential direction are formed on the outer surface of the outer wall portion 53 at an end portion on the wire insertion side, and the press-fitted shield shell 6 can be firmly fixed to the housing 5 by the protrusions 53a.

The shield shell 6 has a cylindrical portion 61 provided to cover the periphery of the outer wall portion 53 of the housing 5, and a flange portion 62 which protrudes outward from an end portion of the cylindrical portion 61 on the front side and is provided as a fixing portion to be fixed to a casing of the mounting member (e.g., an inverter). A belt-shaped fastening member 64 is provided around the shield shell 6. By using the fastening member 64, the braided shield 4 is fixed to the outer surface of the shield shell 6 and the cylindrical portion 61 is tightened and fixed to the housing 5.

Figure 5:
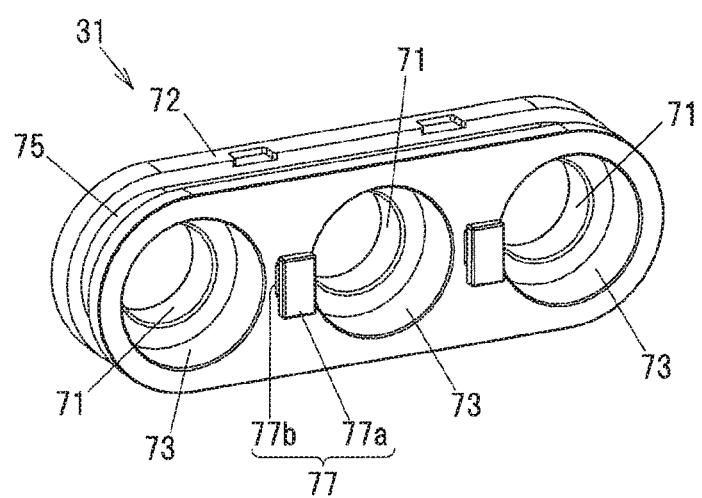
FIG. 5 is a perspective view showing a seal retainer.

As shown in FIGS. 3 and 5, the housed member 31 is a member to be housed in an attachment hole (not shown) formed on the mounting member (e.g., an inverter), and is arranged on the front side relative to the flange portion 62 of the shield shell 6.

The housed member 31 is provided with the seal retainer 72 having three insertion holes 71 for insertion of the electric wires 2, an outer seal member 76 fitted onto the outer peripheral surface of the seal retainer 72 to seal between the inner surface of the attachment hole of the mounting member and the seal retainer 72, and inner seal members (wire seals) 74 fitted onto the inner surfaces of the insertion holes 71 to seal between the insertion holes 71 and the electric wires 2. In FIG. 5, illustrations of the outer seal member 76 and the inner seal members 74 are omitted.

The seal retainer 72 is formed of an insulating resin, e.g., PBT (polybutylene terephthalate), PA (polyamide) or PPS (polyphenylene sulfide), etc.

The outer seal member 76 has an annular shape and is arranged in an outer seal member-receiving groove 75 formed along a circumferential direction on the outer surface of the seal retainer 72. The outer seal member 76 is interposed between the seal retainer 72 and the inner surface of the attachment hole of the mounting member (e.g., an inverter) and prevents water from entering the mounting member (e.g., an inverter) from the outside of the seal retainer 72.

Each inner seal member 74 has an annular shape and is arranged in an inner seal member-receiving groove 73 formed in the insertion hole 71 along the circumferential direction at an end portion of the seal retainer 72 on the housing 5 side. The inner seal member 74 is interposed between the insulation 2b of the electric wire 2 and the seal retainer 72 and prevents water from trickling along the electric wire 2 into the mounting member (e.g., an inverter).

Locking protrusions 77 are integrally formed on a base end portion of the seal retainer 72 and protrude from the base end. Each locking protrusion 77 integrally has a rectangular parallelepiped-shaped head 77a and a rectangular parallelepiped-shaped (rectangular column-shaped) stem (neck) 77b which couples the head 77a to the seal retainer 72 and has smaller width and height than the head 77a.

Locking grooves 56 to be engaged with the locking protrusions 77 are formed on the front wall portion 54b of the housing 5. The locking groove 56 has a head housing portion 56a having larger width, height and length than the head 77a of the locking protrusion 77 and provided to house the head 77a, and a stem housing portion 56b having smaller width and height than the head 77a and larger width and height than the stem 77b and a shorter length than the stem 77b, and is formed so that the head housing portion 56a opens toward the front via the stem housing portion 56b.

In the configuration in which the locking protrusions 77 are engaged with the locking grooves 56 by housing the heads 77a in the head housing portions 56a and the stems 77b in the stem housing portions 56b, the seal retainer 72 can move relative to the wire holding member 32 when fixing the shield shell 6 to a casing of the mounting member (e.g., an inverter). In the present embodiment, the seal retainer 72 can move relative to the housing 5 in the length direction, the width direction and the height direction.

In such a configuration, even when the wire holding member 32 (the shield shell 6 or the housing 5) is rotated or tilted due to torque applied by bending of the electric wire 2 or bolt fixation of the shield shell 6, the seal retainer 72 is less likely to move along with the rotation or tilt and it is thus possible to prevent loss of waterproof function caused by, e.g., excessive compression of only a portion of the outer seal member 76.

Although the head 77a and the stem 77b of the locking protrusion 77 have a rectangular parallelepiped shape (or a rectangular column shape) in this example, the shapes of the head 77a and the stem 77b are not limited thereto. For example, the head 77a and the stem 77b may have a circular column shape or the head 77a may have a spherical shape.

In addition, a means for relatively movably coupling the seal retainer 72 to the wire holding member 32 (the housing 5) is not limited to the locking protrusions 77 and the locking grooves 56. For example, hooks (lances) having elasticity and extending from one of the seal retainer 72 and the housing 5 may be used in combination with locking portions provided on the other of the seal retainer 72 and the housing 5 to engage the hooks, so that elasticity of the hooks allows the seal retainer 72 and the wire holding member 32 (the housing 5) to relatively move even in a state in which the seal retainer 72 is coupled to the housing 5 by engagement between the hooks and the locking protrusions.

Description of the Electromagnetic Wave Suppression Member 8

Figure 6A:
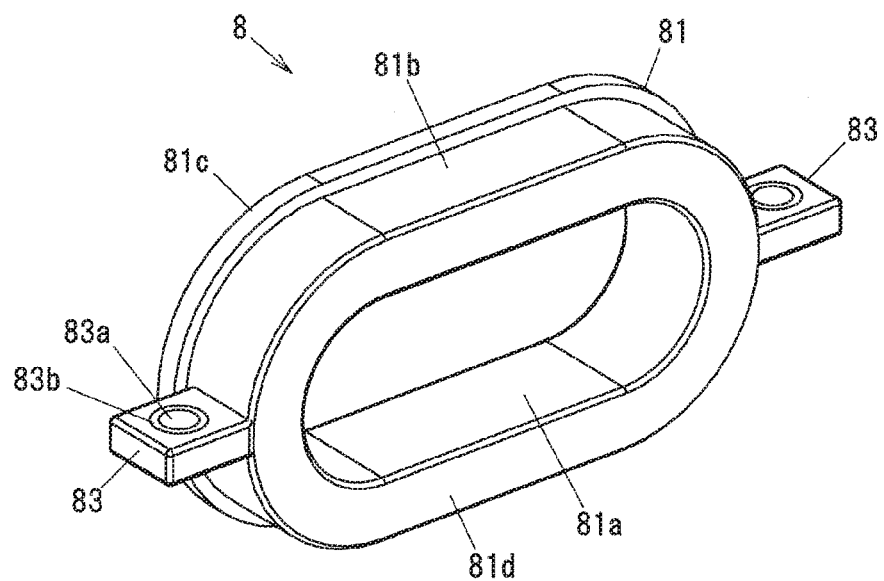
FIG. 6A is a perspective view showing an electromagnetic wave suppression member.
Figure 6B:
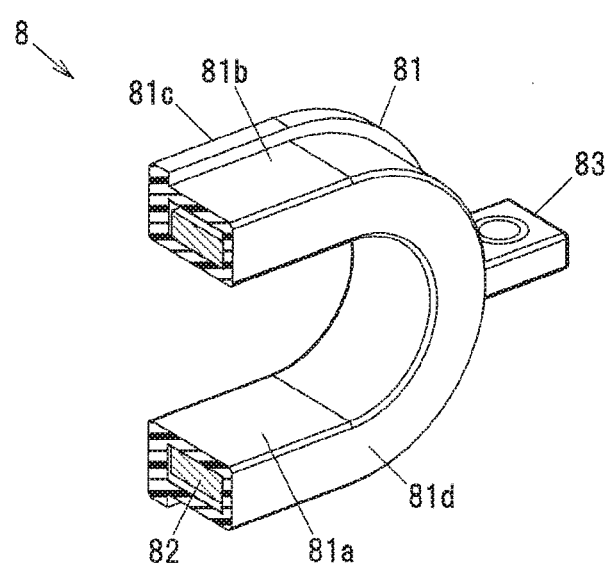
FIG. 6B is a cutaway diagram illustrating the electromagnetic wave suppression member.

FIG. 6A is a perspective view showing the electromagnetic wave suppression member 8 and FIG. 6B is a cutaway diagram thereof.

As shown in FIGS. 1, 6A and 6B, the electromagnetic wave suppression member 8 is provided with a restriction member 81 provided to cover the outer circumference of the electric wires 2 and having an inner wall section 81a which is harder than the electric wires 2, and a ring-shaped magnetic core 82 formed of a nanocrystalline soft magnetic material and provided around the inner wall section 81a. The term "harder" here means that it is more inflexible than others when objects of the same length (e.g., unit length) are held at both ends and bent.

In the present embodiment, the magnetic core 82 is formed of a nanocrystalline soft magnetic material. The nanocrystalline soft magnetic material is a material which is obtained by crystallizing an amorphous alloy so that nanocrystalline grains in the ferromagnetic phase are dispersed in the remaining amorphous phase.

In this example, Finemet (registered trademark) is used as the nanocrystalline soft magnetic material. The magnetic core 82 formed of Finemet (registered trademark) is formed as follow: for example, an alloy melt containing Fe(—Si)—B as a basic component and a trace amount of Cu and an element such as Nb, Ta, Mo or Zr is firstly processed into an amorphous metal ribbon having a thickness of about 20 μm by a rapid quenching method such as single-roll technique, and the ribbon is formed into a magnetic core shape (in this example, a ring shape covering all of the three wire support portions 52) and is then crystallized by heat treatment at not less than crystallization temperature. The grain size of crystal in the magnetic core 82 is about 10 nm. Alternatively, the magnetic core 82 may be formed of another nanocrystalline soft magnetic material other than Finemet (registered trademark) and, for example, NANOMET (registered trademark) may be used.

The nanocrystalline soft magnetic material has a higher saturation magnetic flux density and better soft magnetic properties (higher magnetic permeability, lower core loss characteristics) than conventionally used soft magnetic materials such as soft ferrite. Therefore, it is possible to downsize the magnetic core 82 by using the nanocrystalline soft magnetic material as the magnetic core 82. As a result, it is possible to prevent an increase in size and mass of the electromagnetic wave suppression member 8 and the entire wire harness 1 can remain compact and light in weight even after attaching the electromagnetic wave suppression member 8. By taking into consideration the properties of the nanocrystalline soft magnetic material to be used, the size (thickness and length) of the magnetic core 82 is appropriately adjusted so that desired characteristics are obtained.

As compared to the conventionally used soft magnetic materials such as soft ferrite, the nanocrystalline soft magnetic material also has such properties that it can suppress electromagnetic noise in a frequency band used for radio such as AM radio. In vehicles, traffic information, etc., is provided through AM radio. Therefore, the wire harness 1 especially when used in a vehicle has a profound effect on suppressing electromagnetic noise in a frequency band used for radio.

The nanocrystalline soft magnetic material, however, has properties that magnetic properties change when external stress is applied. Therefore, when using the magnetic core 82 formed of the nanocrystalline soft magnetic material, it should be designed so that external stress is not applied to the magnetic core 82.

Based on this, in the present embodiment, the electromagnetic wave suppression member 8 is configured that the ring-shaped magnetic core 82 formed of the nanocrystalline soft magnetic material is provided around the inner wall section 81a which is harder than the electric wire 2. In this configuration, stress is not applied to the magnetic core 82 when, e.g., the electric wires 2 are bent, and it is thus possible to prevent a change in magnetic properties of the magnetic core 82.

Although the entire restriction member 81 is formed of a material harder than the electric wire 2 in the present embodiment, it is not limited thereto as long as at least the inner wall section 81a is formed of a material harder than the electric wire 2. The restriction member 81 may be formed of an insulating resin, e.g., PBT (polybutylene terephthalate), PA (polyamide) or PPS (polyphenylene sulfide), etc.

If the magnetic core 82 protrudes beyond the inner wall section 81a in the length direction (in the longitudinal direction of the electric wire 2), the protruding portion of the magnetic core 82 may come into contact with the bent electric wires 2, causing a change in magnetic properties of the magnetic core 82. Therefore, the magnetic core 82 is desirably provided so as not to protrude beyond the inner wall section 81a in the longitudinal direction of the electric wire 2.

When the inner wall section 81a is thick, there is no risk of contact between the electric wires 2 and the magnetic core 82 even when the magnetic core 82 slightly protrudes beyond the inner wall section 81a in the length direction (in the longitudinal direction of the electric wire 2) since a distance between the magnetic core 82 and the electric wires 2 is increased. However, the larger the distance between the electric wires 2 and the magnetic core 82, the longer the circumferential length of the laminated magnetic core 82 and the less effective the electromagnetic wave suppression is. That is, by providing the magnetic core 82 so as not to protrude beyond the inner wall section 81a in the longitudinal direction of the electric wire 2 as in the present embodiment, it is possible to prevent a change in magnetic properties of the magnetic core 82 while reducing the thickness of the inner wall section 81a (reducing the distance between the magnetic core 82 and the electric wires 2) to suppress electromagnetic wave more effectively.

In the present embodiment, the restriction member 81 is further provided with a cylindrical outer wall section 81b provided to cover the inner wall section 81a and the magnetic core 82 so that the magnetic core 82 is sandwiched between the inner wall section 81a and the outer wall section 81b, and a front wall section 81c and a rear wall section 81d which are provided as a restricting portion to prevent the magnetic core 82 from falling through between the inner wall section 81a and the outer wall section 81b.

The outer wall section 81b is formed to cover the outer surface of the magnetic core 82 and serves to prevent a change in magnetic properties of the magnetic core 82 caused by contact of surrounding members (vehicle body, etc.) with the magnetic core 82.

The front wall section 81c couples an end portion of the inner wall section 81a to an end portion of the outer wall section 81b on the connector 3 side and covers a gap between the inner wall section 81a and the outer wall section 81b. The rear wall section 81d couples another end portion of the inner wall section 81a to another end portion of the outer wall section 81b on the opposite side to the connector 3 and covers a gap between the inner wall section 81a and the outer wall section 81b. In other words, the restriction member 81 is annular as the entire shape and has a rectangular cross section when taken in a direction perpendicular to the circumferential direction thereof.

In the present embodiment, the inner wall section 81a has a cylindrical shape covering the three electric wires 2 and the braided shield 4, and is configured so that the three electric wires 2 in the aligned state are held therein. Flange portions 83 for fixing the electromagnetic wave suppression member 8 to a vehicle body are formed on the outer wall section 81b respectively at both ends in the alignment direction of the electric wires 2 (in the major axis direction) and protrude outward in the alignment direction of the electric wires 2 (in the major axis direction). A bolt hole 83a for insertion of a bolt used for bolt fixation is formed on each flange portion 83 and a hollow-cylindrical metal collar 83b is provided at a rim of the bolt hole 83a to prevent deformation of the restriction member 81 at the time of tightening the bolt.

In the present embodiment, the inner wall section 81a is formed to cover all of the three electric wires 2 and the magnetic core 82 is provided around the inner wall section 81a so as to cover all of the three electric wires 2. However, it is not limited thereto and the configuration may be such that the inner wall sections are formed to separately cover the electric wires 2 and the magnetic cores 82 are provided to separately cover the electric wires 2. In this regard, however, the intervals between the electric wires 2 (the intervals between the inner walls separately provided around the electric wires 2) need to be increased to the extent that the magnetic cores 82 can be housed therebetween, which may cause an increase in size of the electromagnetic wave suppression member 8. That is, the configuration in which the magnetic core 82 covers all of plural electric wires 2 contributes to downsizing of the electromagnetic wave suppression member 8.

Furthermore, in the present embodiment, the inner wall section 81a is configured to house the electric wires 2 and the braided shield 4 with a predetermined clearance therebetween, allowing the restriction member 81 to be movable in the longitudinal direction of the electric wires 2. As a result, it is possible to finely adjust the position of the electromagnetic wave suppression member 8 so as to be aligned with a fixing position on the vehicle body or it is possible to move the electromagnetic wave suppression member 8 to an appropriate position (e.g., a position not causing bending of the electric wires 2) according to a desired routing layout of the wire harness 1, and the degrees of freedom of routing layout of the wire harness 1 is further improved. In the present embodiment, the connector 3 provided at an end of the electric wires 2 is larger than a space surrounded by the inner wall section 81a, and the connector 3 thereby also serves to prevent the electromagnetic wave suppression member 8 from coming off.

When desired to fix the electromagnetic wave suppression member 8 to a predetermined longitudinal position of the electric wires 2, for example, the electromagnetic wave suppression member 8 can be fixed to the electric wires 2 by winding an adhesive tape, or the electromagnetic wave suppression member 8 can be fixed to the electric wires 2 by providing a clip member gripping and holding the electric wires 2 so that movement of the electromagnetic wave suppression member 8 along the longitudinal direction of the electric wire 2 is restricted by contact with the clip member.

Although the electromagnetic wave suppression member 8 is provided around the braided shield 4 in the present embodiment, it is not limited thereto. The electromagnetic wave suppression member 8 may be provided on the inner side of the braided shield 4, i.e., between the electric wires 2 and the braided shield 4. In this case, since it is difficult to fix the electromagnetic wave suppression member 8 to a vehicle body, etc., by bolt fixation using the flange portions 83, the braided shield 4 and the electromagnetic wave suppression member 8 may be held by a special fixing member and fixed together to a vehicle body, etc., without providing the flange portions 83. By providing the electromagnetic wave suppression member 8 around the braided shield 4 as is in the present embodiment, the need for separate fixing members is eliminated and it is thus possible to reduce the number of components.

Figure 7:
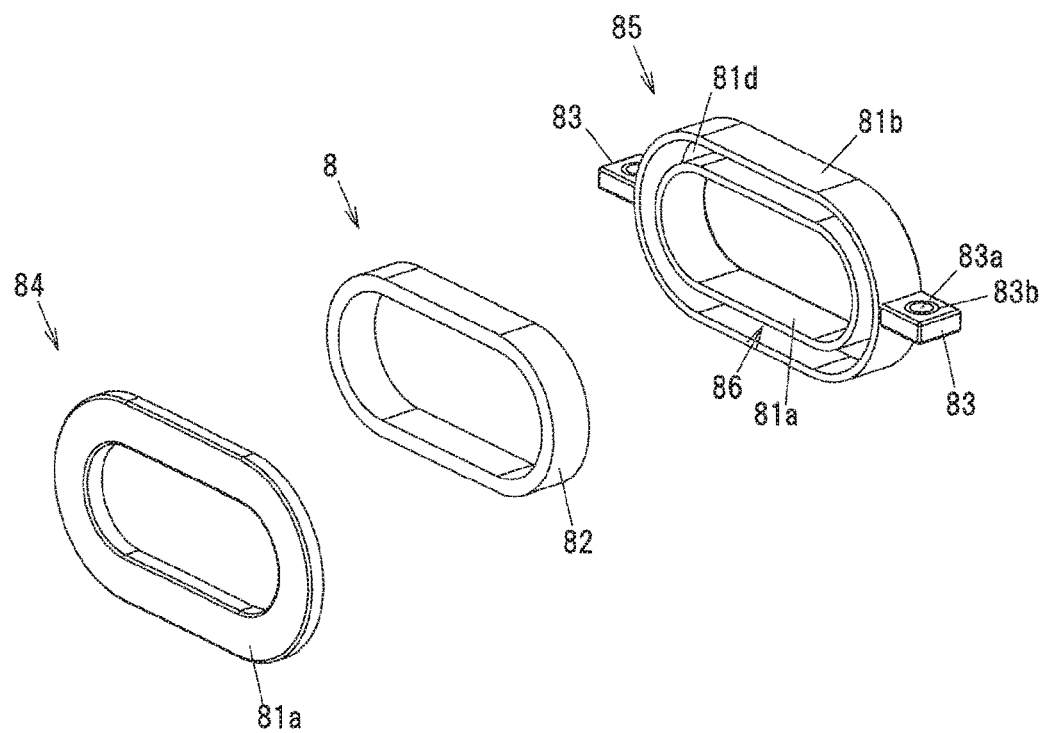
FIG. 7 is an exploded perspective view showing the electromagnetic wave suppression member.

The restriction member 81 may have a split configuration, as shown in FIG. 7. In this example, the electromagnetic wave suppression member 8 is provided with a first member 84 constructed from the front wall section 81c and a second member 85 composed of the inner wall section 81*a*, the outer wall section 81*b* and the rear wall section 81*d*, and is formed by housing the magnetic core 82 in a space 86 surrounded by the inner wall section 81*a*, the outer wall section 81*b* and the rear wall section 81*d* of the second member 85, and then fixing and integrating the first member 84 with the second member 85. The method of fixing the first member 84 to the second member 85 is not specifically limited. For example, the first member 84 and the second member 85 can be fixed and integrated by, e.g., adhesive fixation by an adhesive or mechanical fixation by locking mechanism using lances, etc.

Functions and Effects of the Embodiment

As described above, the wire harness 1 in the present embodiment has the electromagnetic wave suppression member 8 around the electric wires 2, and the electromagnetic wave suppression member 8 is provided with the restriction member 81 covering the electric wires 2 and having the inner wall section 81*a* harder than the electric wires 2, and the ring-shaped magnetic core 82 formed of a nanocrystalline soft magnetic material and provided around the inner wall section 81*a*.

Since the magnetic core 82 is formed of a nanocrystalline soft magnetic material, the magnetic core 82 can have a smaller size than conventionally-used ferrite core, etc., and it is thereby possible to realize a small and light electromagnetic wave suppression member 8. Downsizing of the electromagnetic wave suppression member 8 facilitates routing of the wire harness 1 even in a narrow space and this improves the degree of freedom of the layout of routing the wire harness 1. In addition, since the electromagnetic wave suppression member 8 is light in weight, an increase in mass of the wire harness 1 after attaching the electromagnetic wave suppression member 8 is reduced and it is thereby possible to improve handling properties of the wire harness 1.

In addition, since the magnetic core 82 is provided around the inner wall section 81*a* which is harder than the electric wire 2, load is not applied to the magnetic core 82 even when, e.g., the electric wires 2 are bent or vibrated, and it is thus possible to prevent a change in magnetic properties of the magnetic core 82.

In other words, in the present embodiment, it is possible to realize the wire harness 1 capable of suppressing an increase in its mass and improving the degrees of freedom of routing layout while reducing electromagnetic noise.

Summary of the Embodiment

Technical ideas understood from the embodiment will be described below citing the reference numerals, etc., used for the embodiment. However, each reference numeral, etc., described below is not intended to limit the constituent elements in the claims to the members, etc., specifically described in the embodiment.

[1] A wire harness (1), comprising: electric wires (2); and an electromagnetic wave suppression member (8) provided at a periphery of the electric wires (2), wherein the electromagnetic wave suppression member (8) comprises a restriction member (81) and an annular magnetic core (82), wherein the restriction member is provided so as to cover an outer periphery of the electric wires (2) and comprises an inner wall section (81*a*) that is harder than the electric wires (2), and wherein the magnetic core (82) comprises a nanocrystalline soft magnetic material and is provided at a periphery of the inner wall section (81*a*).

[2] The wire harness (1) defined by [1], wherein the magnetic core (82) is provided so as not to protrude beyond the inner wall section (81*a*) in a longitudinal direction of the electric wires (2).

[3] The wire harness (1) defined by [1] or [2], wherein the restriction member (81) comprises a cylindrical outer wall section (81*b*) covering the inner wall section (81*a*) and the magnetic core (82) so that the magnetic core (82) is sandwiched between the inner wall section (81*a*) and the outer wall section (81*b*), and restricting portions (81*c*, 81*d*) preventing the magnetic core (82) from falling through between the inner wall section (81*a*) and the outer wall section (81*b*).

[4] The wire harness (1) defined by any one of [1] to [3], wherein the restriction member (81) is provided so as to be movable along a longitudinal direction of the electric wires (2).

[5] The wire harness (1) defined by any one of [1] to [4], wherein the magnetic core (82) is formed to cover all of a plurality of electric wires (2).

[6] An electromagnetic wave suppression member (8) for being provided at a periphery of electric wires (2), comprising: a restriction member (81) that is provided so as to cover an outer periphery of the electric wires (2) and comprises an inner wall section (81*a*) that is harder than the electric wires (2); and an annular magnetic core (82) that comprises a nanocrystalline soft magnetic material and is provided at a periphery of the inner wall section (81*a*).

Although the embodiment of the invention has been described, the invention according to claims is not to be limited to the embodiment described above. Further, please note that all combinations of the features described in the embodiment are not necessary to solve the problem of the invention.

The invention can be appropriately modified and implemented without departing from the gist thereof.

For example, although three electric wires 2 are provided in the embodiment, the number of the electric wires 2 is not limited and may be, e.g., one, two, or not less than four.

REFERENCE SIGNS LIST

1 WIRE HARNESS
2 ELECTRIC WIRE
3 CONNECTOR
4 BRAIDED SHIELD
8 ELECTROMAGNETIC WAVE SUPPRESSION MEMBER
81 RESTRICTION MEMBER
81*a* INNER WALL SECTION
81*b* OUTER WALL SECTION
81*c* FRONT WALL SECTION (RESTRICTING PORTION)
81*d* REAR WALL SECTION (RESTRICTING PORTION)
82 MAGNETIC CORE

The invention claimed is:
1. A wire harness, comprising:
electric wires; and
an electromagnetic wave suppression member provided at a periphery of the electric wires,
wherein the electromagnetic wave suppression member comprises a restriction member and an annular magnetic core,
wherein the restriction member is provided so as to cover an outer periphery of the electric wires and comprises an inner wall section, wherein the magnetic core comprises a nanocrystalline soft magnetic material and is provided at a periphery of the inner wall section, wherein the restriction member is provided so as to be movable along a longitudinal direction of the electric wires, and wherein the restriction member comprises a cylindrical outer wall section covering the inner wall section and the magnetic core so that the magnetic core is sandwiched between the inner wall section and the outer wall section, and restricting portions preventing the magnetic core from falling through between the inner wall section and the outer wall section.

2. The wire harness according to claim 1, wherein the magnetic core is formed so as to cover all of a plurality of electric wires.

3. A wire harness, comprising:

electric wires; and an electromagnetic wave suppression member provided at a periphery of the electric wires, wherein the electromagnetic wave suppression member comprises a restriction member and an annular magnetic core, wherein the restriction member is provided so as to cover an outer periphery of the electric wires and comprises an inner wall section, wherein the magnetic core comprises a nanocrystalline soft magnetic material and is provided at a periphery of the inner wall section, wherein the restriction member is provided so as to be movable along a longitudinal direction of the electric wires, wherein the magnetic core is provided so as not to protrude beyond the inner wall section in a longitudinal direction of the electric wires, and wherein the restriction member comprises a cylindrical outer wall section covering the inner wall section and the magnetic core so that the magnetic core is sandwiched between the inner wall section and the outer wall section, and restricting portions preventing the magnetic core from falling through between the inner wall section and the outer wall section.

4. The wire harness according to claim 3, wherein the magnetic core is formed so as to cover all of a plurality of electric wires.

5. The wire harness according to claim 1, wherein the inner wall section is harder than the electric wires.

6. The wire harness according to claim 3, wherein the inner wall section is harder than the electric wires.

* * * * *